US008699746B2

(12) United States Patent
Sarraf et al.

(10) Patent No.: US 8,699,746 B2
(45) Date of Patent: Apr. 15, 2014

(54) WATERMARKING SCHEME FOR DIGITAL VIDEO

(75) Inventors: Mohsen Sarraf, Rumson, NJ (US); Mohammad Hossein Zarrabizadeh, Woodbridge, NJ (US)

(73) Assignee: Alcatel Lucent, Paris (FR)

( * ) Notice: Subject to any disclaimer, the term of this patent is extended or adjusted under 35 U.S.C. 154(b) by 1673 days.

(21) Appl. No.: 10/342,704

(22) Filed: Jan. 15, 2003

(65) Prior Publication Data
US 2004/0136562 A1    Jul. 15, 2004

(51) Int. Cl.
*G06K 9/00*    (2006.01)

(52) U.S. Cl.
USPC ............................................. 382/100; 382/162

(58) Field of Classification Search
USPC .................................. 382/100, 162, 166, 274
See application file for complete search history.

(56) References Cited

U.S. PATENT DOCUMENTS

| | | | | |
|---|---|---|---|---|
| 5,663,766 A * | 9/1997 | Sizer, II | ........................ | 348/473 |
| 6,222,932 B1 * | 4/2001 | Rao et al. | ....................... | 382/100 |
| 6,332,030 B1 * | 12/2001 | Manjunath et al. | ........... | 382/100 |
| 6,571,021 B1 * | 5/2003 | Braudaway | ................... | 382/275 |
| 6,590,996 B1 * | 7/2003 | Reed et al. | ..................... | 382/100 |
| 6,640,005 B1 * | 10/2003 | Westerman et al. | .......... | 382/166 |
| 6,647,125 B2 * | 11/2003 | Matsumoto et al. | .......... | 382/100 |
| 6,885,756 B2 * | 4/2005 | Kitamura | ..................... | 382/100 |

\* cited by examiner

*Primary Examiner* — Wesley Tucker
(74) *Attorney, Agent, or Firm* — E. J. Rosenthal

(57) ABSTRACT

A system and method for digital watermarking a video signal with an increased bit rate is achieved by inserting the additional information which constitutes the watermarking signal within the video signal on the chrominance signal. Thus, the additional information is "impressed" upon the chrominance component of the video signal. The human visual system is much less sensitive to chrominance than to luminance, and therefore, additional distortion which results from the higher bit rate can be allowed on the chrominance signal and yet such distortion will not be detected by the human visual system.

20 Claims, 4 Drawing Sheets

WATERMARKING SCHEME FOR DIGITAL VIDEO

TECHNICAL FIELD

This invention relates to the art of watermarking digital video, and more particularly, to including additional information within the digital video information.

BACKGROUND OF THE INVENTION

Watermarking of video signals is, generally, the inclusion within the video itself of additional information. This can be useful to provide an embedded identification of the source of a video, to keep track of where and for how long a video is played, and to communicate information via the video to an ancillary device. Prior art techniques for watermarking video signals typically encoded the additional information in an analog format within the video itself using the luminance of the video to carry the additional information. However, the human visual system is very sensitive to the luminance signal, and so a person viewing a watermarked signal easily perceives distortion which is caused by the changes made to the video signal to convey the additional information when there is an attempt to increase the bit rate of the additional information beyond a certain point, e.g., beyond 120 bits per second. Thus, although the prior art's techniques of watermarking of video signals has had some success in certain applications, such success has been limited by the extremely small bit rate that is achievable without perceivable distortion by a person viewing the video signal carrying the additional information.

SUMMARY OF THE INVENTION

We have recognized that the human visual system is much less sensitive to chrominance than to luminance. Therefore, we have developed a system for digital watermarking a video signal that, in accordance with the principles of the invention, inserts the additional information of the watermarking signal on the chrominance component of the video signal rather than on its luminance signal. Thus, the additional information is "impressed" upon the chrominance component of the video signal. Advantageously, although there may be significant distortion on the chrominance signal, especially when the additional information has higher bit rates than is achievable without perceivable distortion by the prior art, nevertheless such distortion will not be detected by the human visual system, provided it is appropriately managed. Thus, the additional information can have a higher bit rate as compared with that achievable by the prior art, e.g., bit rates greater than 150 bits per second can be achieved. Further advantageously, the additional data can be recovered from the video signal even after the video signal watermarked with the additional data is compressed using the Motion Picture Expert Group (MPEG)-1 and MPEG-2 encoding systems.

DETAILED DESCRIPTION

Figure 1:
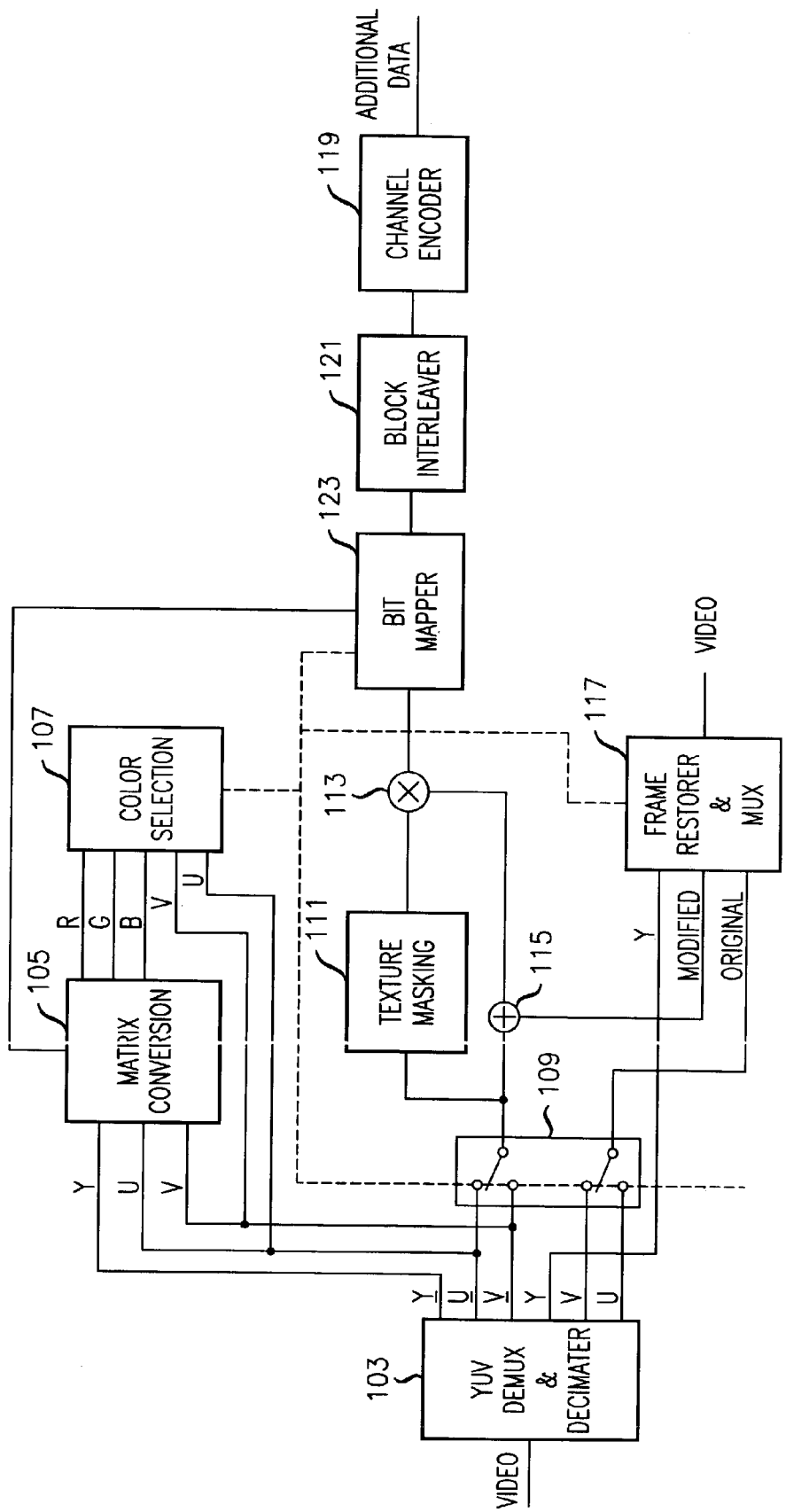
FIG. 1 shows an exemplary transmitter for digital watermarking a video signal, in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware which is expressly or implicitly shown.

Unless otherwise explicitly specified herein, the drawings are not drawn to scale.

In the description, identically numbered components within different ones of the FIGs. refer to the same components.

FIG. 1 shows exemplary transmitter 101 for digital watermarking a video signal with an increased bit rate as compared to the prior art, in accordance with the principles of the invention, by inserting the additional information which constitutes the watermarking signal within the video signal on the chrominance signal. Shown in FIG. 1 are a) YUV demultiplexer (demux) and decimator 103, b) matrix conversion unit 105, c) color selection unit 107, d) dual pole double throw switch 109, e) texture masking unit 111, f) multiplier 113, g) adder 115, and h) YUV frame restorer and multiplexer (mux) 117. Also shown in FIG. 1 are optional i) channel encoder 119, j) block interleaver 121, and bit mapper 123.

YUV demultiplexer and decimator 103 receives a video signal to be watermarked, i.e., to have additional information added thereto. YUV demultiplexer and decimator 103 works with digital video, e.g., formatted according to the serial digital interface (SDI). As will be recognized by those of ordinary skill in the art, any video signal not initially in an appropriate digital format may be converted thereto using conventional techniques.

YUV demultiplexer and decimator 103 demultiplexes the luminance (Y) component of the video and its chrominance component. The chrominance component of the video signal has two portions U and V, where U is the differential blue portion and V is the differential red portion. The demultiplexed luminance (Y) and the chrominance (U and V) are supplied to matrix conversion unit 105 and to dual pole double throw switch 109.

Much of the processing to embed the additional data on the chrominance component is preferably, performed with a special decimated video format in which for each original 2×2 pixel block of video, had the original block been in 4-4-4 representation, there remains only one Y, one U, and one V value. To this end, in the event the input video signal is actually in the so-called 4-4-4 format, the image is appropriately decimated by YUV demultiplexer and decimator 103 so that for each original 2×2 block there is one Y, one U, and one V value. Similarly, in the event the input video signal is in the so-called "4-2-2" format, i.e., the luminance is full resolution while the chrominance is a) full resolution horizontally only and b) half resolution vertically, YUV demultiplexer and decimator 103 decimates the luminance component horizontally and vertically as well as decimates the chrominance component only horizontally. Likewise, in the event the input video signal is in the so-called 4-2-0 format, i.e., the luminance is full resolution while the chrominance is only half resolution both vertically and horizontally, the luminance of the image is decimated by YUV demultiplexer and decimator 103 so that for each original 2×2 block had the original block been in 4-4-4 representation there remains only one Y., one U, and one V value. The decimated video format is supplied as an output to matrix conversion unit 105. Thus, regardless of the format of the input video signal, further processing by the system is based on the decimated video signal such that for every 2×2 block of luminance pixels of the original input video signal there is one Y, one U and one V value. Those of ordinary skill in the art will be able to develop their own methods, should they choose to do so, of developing one Y, one U and one V value for every 2×2 block of luminance pixels.

In order to know the format of the original video, a) an operator needs to indicate to YUV demultiplexer and decimator 103 the particular format of the video supplied to transmitter 101, b) the format of the video may be detected directly from the video using conventional techniques, or c) the information may be supplied from a higher layer processor which is supplying the input video signal.

YUV demultiplexer and decimator 103 also supplies a second set of YUV outputs in the full format of the original input video signal.

Matrix conversion unit 105 converts the YUV representation of the video signal that it receives from YUV demultiplexer and decimator 103 into a red, green, blue (RGB) representation thereof, e.g., in the conventional manner. The RGB representation of the video signal is supplied to color selection unit 107.

Color selection unit 107 receives the same U and V chrominance portions as was supplied to matrix conversion unit 105 as well as the KGB representation of the video signal, and uses them to determine on which portion of the chrominance component, i.e., on the U portion or the V portion, will the additional information be embedded for each pixel. The output of color selection unit 107 is used to control the position of dual pole double throw switch 109. More specifically, color selection unit 109 selects the chrominance portion U or V, as a function of R, G, and B, and possibly of U and V as well, as will be described in more detail hereinbelow, on which the additional information will be embedded for this pixel. The output of color selection unit 107 is then set so that dual pole double throw switch 109 1) supplies the portion of the chrominance component to which the additional data is to be added to texture masking unit 111 and 2) supplies the portion of the chrominance component to which the additional data is not to be added to YUV frame restorer and multiplexer 117. The output of color selection unit 107 is also supplied to YUV frame restorer and multiplexer 117.

Texture masking unit 111 analyzes the texture of the chrominance area around each pixel to determine how much distortion can be introduced into that pixel and supplies as an output a weight indicative thereof. The weight may be coded, e.g., taking integral values from 1 to 5. The weight is supplied to multiplier 113.

Multiplier 113 multiplies the weight received from texture masking unit 111 by a binary data value, i.e., 1 or 0, of the additional information which is to be transmitted for this pixel. The additional data may be supplied directly to multiplier 113 or it may first be processed to facilitate processing and recovery of the information at the receiver. The product produced by multiplier 113 is supplied to adder 115.

Adder 115 produces a modified chrominance portion by adding the product supplied by multiplier 115 to the value of the portion of the chrominance which was selected by color selection unit 107 to carry the additional information for the pixel. As indicated, the portion of the chrominance which was selected by color selection unit 107 to carry the additional information is passed to adder 115 by dual pole double throw switch 109. The modified chrominance portion supplied by adder 115 is supplied to YUV frame restorer and multiplexer 117.

YUV frame restorer and multiplexer 117 receives the original luminance signal (Y) and the unmodified chrominance signal portion which was supplied from YUV demultiplexer and decimator 103 via double-pole, double-throw switch 109. YUV frame restorer and multiplexer 117 also receives the modified chrominance signal portion from adder 115 and upsamples it to match the format of the unmodified chrominance signal portion. YUV frame restorer and multiplexer 117 then multiplexes together the original luminance signal (Y) and the unmodified chrominance signal portion and the upsampled modified chrominance signal portion. YUV frame restorer and multiplexer 117 knows on which lead it receives the modified portion of the chrominance component and on which lead it receives the unmodified portion of the chrominance component by virtue of receiving the signal from color selection unit 107. In accordance with an aspect of the invention, the resulting video signal is supplied as the watermarked output video signal.

Those of ordinary skill in the art will be able to develop embodiments of the invention in which the additional data is added to the original chrominance signal portion rather than the decimated version thereof, so that upsampling will not be required.

As indicated above, the binary data value, i.e., 1 or 0, of the additional information which is to be transmitted for each pixel may be supplied directly to multiplier 113 or it may first be processed to facilitate the processing and recovery of the information at the receiver. Such exemplary processing may be performed by optional i) channel encoder 119, j) block interleaver 121, and bit mapper 123.

Channel encoder 119 receives the additional data that is desired to be embedded in the video stream. This data is then encoded, e.g., using a forward error correcting coding scheme. Such forward error correcting scheme may be any conventional forward error correcting scheme, such as convolutional encoding, e.g., Viterbi encoding or turbo encoding, or it may be any newly developed coding scheme. In one exemplary embodiment of the invention, turbo coding of rate one-third is used. As a result of such coding, three bits are produced for every bit of the original bit stream. Using such an encoder, a bit rate of around 12,000 bits per second, substantially error free, has been achieved for the additional information as supplied to channel encoder 119 when the video frame size is 640×480 pixels. The channel encoded bit stream is supplied as an output by channel encoder 119 to block interleaver unit 121.

Block interleaver 121 rearranges the order of the bits channel encoded bit stream in order to randomize the data. Doing so helps reduce the chance that adjacent sections of the channel encoded bit stream are lost, e.g., due to noise or other factors, which would then make it difficult to recover such data at the receiver from the remaining, actually received data. A block interleaver may be implemented by writing data sequentially to the rows of a block left to right, at the end of each row starting again at the leftmost position of the next row down and then reading the data by starting at the leftmost topmost position of the block and reading down a column until the end of the column is reached at which point reading continues at the top of the next column. A block interleaver of 55 rows by 44 columns has proven effective for a picture size of 640 by 480 pixels. For different resolutions, those of ordinary skill in the art will be readily able to develop comparable block encoders. The interleaved channel encoded bit stream is supplied as an output by bit interleaver 121 to bit mapper 123.

In one embodiment of the invention, bit mapper 123 provides a data bit from the interleaved channel encoded bit stream which is to be communicated for each block of the original video signal when it is in 4-2-0 format. In accordance with an aspect of the invention, the data bit must be impressed upon the chrominance component of each pixel of the block in the original video signal. To this end, bit mapper 123 is supplied with information from matrix conversion unit 105 as to any decimation that is required to convert the original video signal to 4-2-0 format. Bit mapper 123 then supplies the data bit from the interleaved channel encoded bit stream which is to be communicated for each block of the original video signal as appropriate for each pixel of the block of the original video signal when that pixel is to be incorporated into the watermarked output video signal. Thus, bit mapper 123 takes into account the fact that the processing of the video signal is line based, i.e., the processing is left to right on a line, then down to the next line and left to right again, and so the adjacent pixels of a block are not necessarily sequential in the video stream and so are not all processed in time directly one after the other. The particular data bit supplied as an output of bit mapper 123 at any time is supplied as an input to multiplier 113. In accordance with an aspect of the invention, bit mapper 123 may also differentially encode the data to be impressed with respect to the same pixel position in the prior frame. To this end, the data for at least one preceding frame may be stored in bit mapper 123.

Figure 2:
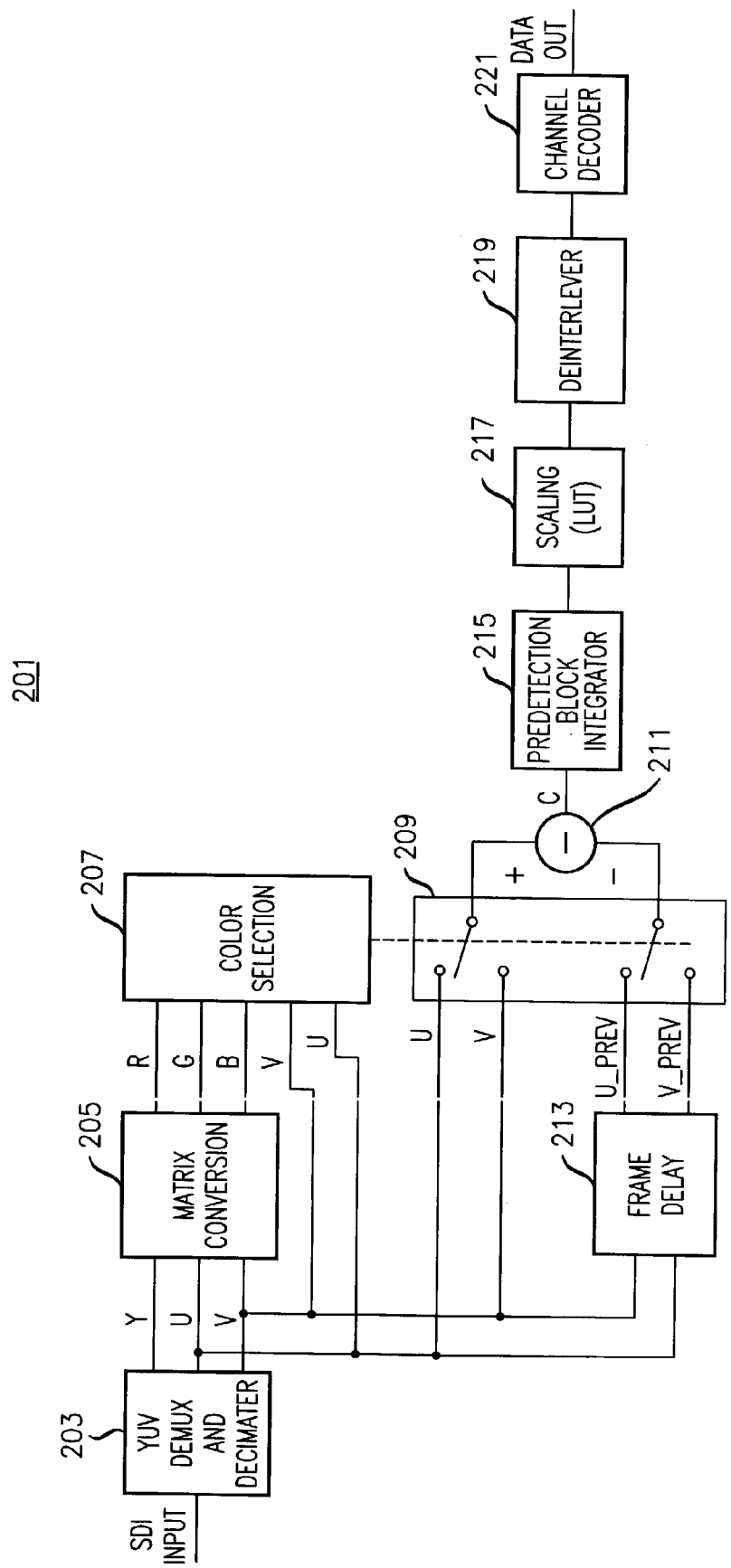
FIG. 2 shows an exemplary receiver for recovering the additional data of a video signal containing digital watermarking on the chrominance signal thereof, in accordance with the principles of the invention.

FIG. 2 shows exemplary receiver 201 for recovering the additional data of a video signal containing digital watermarking on the chrominance signal thereof, in accordance with the principles of the invention. Shown in FIG. 2 are a) YUV demultiplexer (demux) and decimator 203, b) matrix conversion unit 205, c) color selection unit 207, d) dual pole double throw switch 209, e) subtractor 211, f) frame delay 213, g) predetection block integrator 215, h) scaling unit 217, i) deinterleaver 219, and j) channel decoder 221.

YUV demultiplexer and decimator 203, which may be substantially the same as YUV demultiplexer and decimator 103 of transmitter 101 (FIG. 1), receives a video signal that has been digitally watermarked in that additional information has been added thereto on the chrominance of the signal, in accordance with the principles of the invention. YUV demultiplexer and decimator 203 works with digital video, e.g., formatted according to the serial digital interface (SDI). As will be recognized by those of ordinary skill in the art, any video signal not initially in an appropriate digital format may be converted thereto using conventional techniques. YUV demultiplexer and decimator 203 demultiplexes the luminance (Y) component of the video and its chrominance component and decimates it to the preferred processing format in which for each original 2×2 pixel block of video, had the original block been in 4-4-4 representation, there remains only one Y, one U, and one V value. The demultiplexed luminance (Y) and the chrominance (U and V) are supplied to matrix conversion unit 205, while the chrominance is supplied to dual pole double throw switch 209, and frame delay 213. Unlike YUV demultiplexer and decimator 103, YUV demultiplexer and decimator 203 need not also supply a second set of YUV outputs in the full format of the original input video signal The operator needs to indicate to YUV demultiplexer and decimator 203 the particular format of the input video, the format of the video could be detected directly from the video using conventional techniques, or the information could be supplied from a higher layer processor which is supplying the input video signal.

Matrix conversion unit 205, which may be substantially identical to matrix conversion unit 105 of transmitter 101 (FIG. 1), converts the YUV representation of the video signal that it receives from YUV demultiplexer and decimator 203 into a red, green, blue (RGB) representation thereof, e.g., in the conventional manner. The RGB representation of the video signal is supplied to color selection unit 207.

Color selection unit 207, which may be substantially the same as color selection unit 107 of transmitter 101 (FIG. 1) receives U and V chrominance portions, as well as the RGB representation of the video signal, and uses them to determine on which portion of the chrominance component, i.e., on the U portion or the V portion, has the additional information embedded for each pixel. The output of color selection unit 207 is used to control the position of dual pole double throw switch 209. More specifically, color selection unit 209 selects the chrominance portion U or V, as a function of R, G, and B, and possibly of U and V as well, as will be described in more detail hereinbelow, on which the additional information was likely to have been embedded for this pixel. The output of color selection unit 207 is then set so that dual pole double throw switch 209 supplies to subtractor 211 both the portion of the chrominance component to which the additional data was determined to have been added and the portion of the chrominance component of the corresponding pixel of the preceding frame, which was stored in frame delay 213, to which the additional data was determined to have been added for the current frame.

Frame delay 213 stores at least the chrominance values of a frame preceding the current frame.

Subtractor 211 subtracts the value of the portion of the chrominance component of the corresponding pixel of the preceding frame to which the additional data was determined to have been added for the current frame from the value of the portion of the chrominance component to which the additional data was determined to have been added to the current frame, and supplies the resulting difference as an output to predetection block integrator 215. This resulting difference represents the value of the additional data that is believed to have been impressed on the chrominance signal for this pixel.

Predetection block integrator 215 integrates the values from subtractor 211 over a block, e.g., the values for each pixel in a block are combined in a prescribed manner, at least one of which is described further hereinbelow. The output of predetection block integrator 215 is a soft value representing the additional data which was impressed on each pixel of an 8×8 block of the original video signal.

Scaler 217 receives as an input the output of predetection integrator 215 and gives a rating to each value it receives therefrom. In one embodiment of the invention, the rating may be based on how close the value is to the expected value had the image of the video signal been static with respect to the previous frame and had there been no chrominance changes throughout the block. In another embodiment of the invention, scaler 217 may include a texture analyzer and it may perform its rating function based on the texture determined to exist in the block. Based on the rating, scaler 215 then scales each value to be within the range which can be processed by decoder 221.

The scaled values developed by scaler 217 are supplied to deinterleaver 219, which reorders the data to undo the effect of block interleaver 121 of transmitter 101 (FIG. 1). Note that the data may be so-called "soft data", with the final determination of the actual information that was received being determined in channel decoder 221. The reordered values are then supplied to channel decoder 221, which performs decoding for a signal that was encoded using the type of encoding employed by channel encoder 119 of transmitter 101 (FIG. 1). The resulting decoded values are supplied by decoder 221 as the reconstructed version of the additional data signal. For further robustness, channel decoder may be a so-called "sequence decoder", e.g., a turbo decoder.

Figure 3:
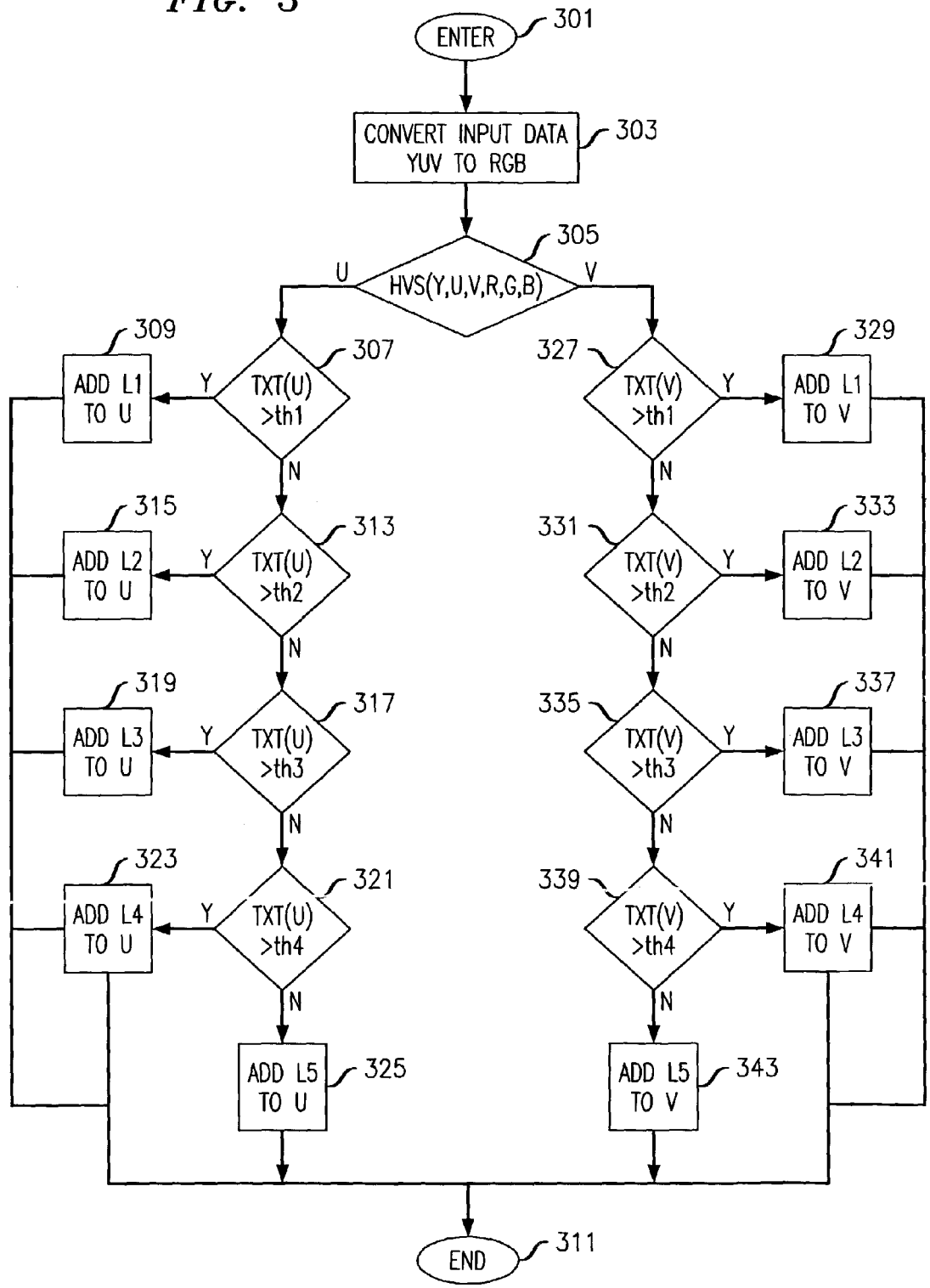
FIG. 3 shows an exemplary process for texture masking to be used with a video signal when an encoded logic one needs to be transmitted, in accordance with the principles of the invention.

FIG. 3 shows an exemplary process for texture masking to be used with a video signal when an encoded logic one needs to be transmitted, in accordance with the principles of the invention. For those blocks where an encoded logic zero needs to be transmitted, the block is transmitted unmodified. The process of FIG. 3 may be performed in an exemplary embodiment of the invention, such as the one shown in FIG. 1, in color selection unit 107 (FIG. 1).

The process is entered in step 301 (FIG. 3) when a new pixel of the decimated frame is to be processed. In step 303, an RGB representation of the pixel being processed is developed, e.g., by matrix conversion unit 105 (FIG. 1). Thereafter, conditional branch point 305 (FIG. 3), tests to determine whether the logic one to be encoded will be impressed on the U chrominance portion or the V chrominance portion. This test may be carried out by color selection unit 107 (FIG. 1). One way of performing this test is to compute the value of a human visual system (HVS) function which we have developed as follows.

$$HVS(Y,U,V,R,G,B)=\{[((G<90)\wedge (G<R))\vee (U<V)] \vee ((R<G)\wedge (B<G))\}\wedge \sim((G<0.5B)\wedge (R<0.5B)),$$

where $\wedge$ means logical AND operator, $\vee$ means the logical OR operator, and $\sim$ means logical inverse operator. The $<$ operator, the less than operator, evaluates to a 1 when the expression is met and to a 0 depending when the expression is not met. This HVS formula has been empirically derived by trial and error by adding data to a fixed video clip and determining which combinations yield the least distortion, especially flicker, perceivable by the eye. Note that the value 90 is for use with systems having 8 bit resolution, such as MPEG-1 and 2 systems. Other acceptable formulas may be developed by those of ordinary skill in the art. If the value of HVS(Y,U,V,R,G,B) is 1, then the result is considered to be U. If the value of HVS(Y,U,V,R,G,B) is 0, then the result is considered to be V.

If the test result in step 305 is U, indicating that the data to be encoded should be encoded on the U chrominance portion, control passes to conditional branch point 307, which tests to determine whether the color variance for the U chrominance portion, i.e., the texture of the U chrominance portion (TXT (U)), is greater than a first prescribed threshold th1, which is the largest threshold. In one embodiment of the invention, the color variance is evaluated by looking at the difference in color values between the pixel being processed and its neighboring pixels, e.g., its immediately adjacent neighbors, and taking an average of the differences. Mathematically, such a color variance may be expressed by $$TXT(U(m,n)) = \sum_{i=-1}^{1}\sum_{j=-1}^{1}[U(m,n)-U(m-i,n-j)]^2$$

where m is the index of the row of the frame and n is the index of the column of the frame, i is the offset values used to point to the eight adjacent pixels of pixel (m,n).

If the test result in step 307 is YES, indicating that the color variance is large enough that the data may be encoded with a defined maximum encoded value, represented by L1, e.g., 5, control is passed to step 309, in which the value of L1 is added to the value of the U chrominance portion. Control then passes to step 311 and the process is exited for this pixel.

If the test result in step 307 is NO, indicating that the color variance for the U chrominance portion is not greater than the first prescribed threshold th1, which is the largest threshold, control passes to conditional branch point 313, which tests to determine if the color variance for the U chrominance portion is greater than a second prescribed threshold th2, which is the second largest threshold. If the test result in step 313 is YES, indicating that the color variance is large enough that the data may be encoded with the second largest encoded value, represented as L2, e.g., 4, control is passed to step 315, in which the value of L2 is added to the value of the U chrominance portion. Control then passes to step 311 and the process is exited for this pixel.

If the test result in step 313 is NO, indicating that the color variance for the U chrominance portion is not greater than the second prescribed threshold th2, control passes to conditional branch point 317, which tests to determine if the color variance for the U chrominance portion is greater than a third prescribed threshold th3, which is the second smallest threshold. If the test result in step 317 is YES, indicating that the color variance is large enough that the data may be encoded with the middle encoded value, represented as L3, e.g., 3, control is passed to step 319, in which the value of L3 is added to the value of the U chrominance portion. Control then passes to step 311 and the process is exited for this pixel.

If the test result in step 317 is NO, indicating that the color variance for the U chrominance portion is not greater than the third prescribed threshold th3, control passes to conditional branch point 321, which tests to determine if the color variance for the U chrominance portion is greater than a fourth prescribed threshold th4, which is the smallest threshold. If the test result in step 321 is YES, indicating that the color variance is large enough that the data may be encoded with the second smallest encoded value, represented as L4, e.g., 2, control is passed to step 323, in which the value of L4 is added to the value of the U chrominance portion. Control then passes to step 311 and the process is exited for this pixel.

If the test result in step 321 is NO, indicating that the color variance is only large enough that the data may be encoded with the smallest encoded value, represented as L5, e.g., 1, control is passed to step 325, in which the value of L5 is added to the value of the U chrominance portion. Control then passes to step 311 and the process is exited for this pixel.

If the test result in step 305 is V, indicating that the data to be encoded should be encoded on the V chrominance portion, control passes to conditional branch point 327, which tests to determine whether color variance for the V chrominance portion is greater than a first prescribed threshold th1, which is the largest threshold. As previously indicated, in one embodiment of the invention, the color variance is evaluated by looking at the difference in color values between the pixel being processed and its neighboring pixels, e.g., its immediately adjacent neighbors, and taking an average of the differences. Mathematically, such a color variance may be expressed by Mathematically, such a color variance may be expressed by $$TXT(V(m,n)) = \sum_{i=-1}^{1} \sum_{j=-1}^{1} [V(m,n) - V(m-i, n-j)]^2$$

where m is the index of the row of the frame and n is the index of the column of the frame, i is the offset values used to point to the eight adjacent pixels of pixel (m, n).

If the test result in step 327 is YES, indicating that the color variance is large enough that the data may be encoded with the maximum encoded value, represented as L1, e.g., 5, control is passed to step 329, in which the value of L1 is added to the value of the V chrominance portion. Control then passes to step 311 and the process is exited for this pixel.

If the test result in step 327 is NO, indicating that the color variance for the V chrominance portion is not greater than the first prescribed threshold th1, which is the largest threshold, control passes to conditional branch point 331, which tests to determine if the color variance for the V chrominance portion is greater than a second prescribed threshold th2, which is the second largest threshold. If the test result in step 331 is YES, indicating that the color variance is large enough that the data may be encoded with the second largest encoded value, represented as L2, e.g., 4, control is passed to step 333, in which the value of L2 is added to the value of the V chrominance portion. Control then passes to step 311 and the process is exited for this pixel.

If the test result in step 331 is NO, indicating that the color variance for the V chrominance portion is not greater than the second prescribed threshold th2, control passes to conditional branch point 335, which tests to determine if the color variance for the V chrominance portion is greater than a third prescribed threshold th3, which is the second smallest threshold. If the test result in step 335 is YES, indicating that the color variance is large enough that the data may be encoded with the middle encoded value, L3, a predefined amount, e.g., 3, control is passed to step 337, in which the value of L3 is added to the value of the V chrominance portion. Control then passes to step 311 and the process is exited for this pixel.

If the test result in step 335 is NO, indicating that the color variance for the V chrominance portion is not greater than the third prescribed threshold th3, control passes to conditional branch point 339, which tests to determine if the color variance for the V chrominance portion is greater than a fourth prescribed threshold th4, which is the smallest threshold. If the test result in step 339 is YES, indicating that the color variance is large enough that the data may be encoded with the second smallest encoded value, represented as L4, e.g., 2, control is passed to step 341, in which the value of L4 is added to the value of the V chrominance portion. Control then passes to step 311 and the process is exited for this pixel.

If the test result in step 339 is NO, indicating that the color variance is only large enough that the data may be encoded with the smallest encoded value, represented as L5, e.g., 1, control is passed to step 343, in which the value of L5 is added to the value of the V chrominance portion. Control then passes to step 311 and the process is exited for this pixel.

Note that although the use of 4 thresholds and 5 encoded values has been shown in FIG. 3, those of ordinary skill in the art will readily be able to adapt the indicated method to other numbers of thresholds and encoded values.

Figure 4:
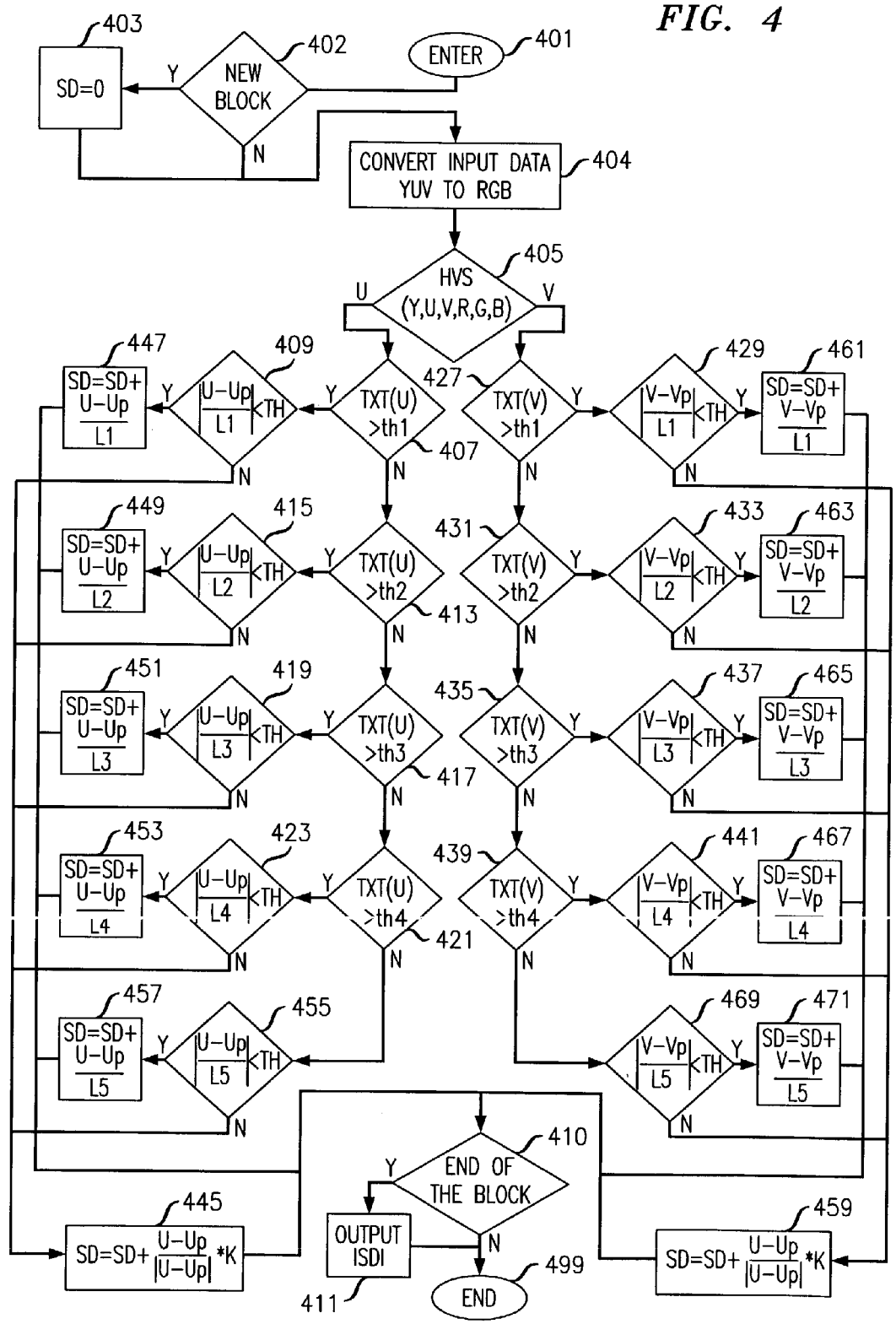
FIG. 4 shows an exemplary process for processing a digitally watermarked video signal that has additional information which constitutes the watermarking signal within the video signal impressed upon the chrominance signal in order to extract the additional information, in accordance with the principles of the invention.

FIG. 4 shows an exemplary process for processing a digitally watermarked video signal that has additional information which constitutes the watermarking signal within the video signal impressed upon the chrominance signal in order to extract the additional information, in accordance with the principles of the invention. Such a process may be performed in an exemplary embodiment of the invention, such as the one shown in FIG. 2, across color selection 207, dual pole double throw switch 209, subtractor 211, frame delay 213, predetection block integrator 215 and scaling 217 (FIG. 2).

The process is entered in step 401 (FIG. 4) when a new pixel of the received decimated frame is to be processed. Note that, as with FIG. 3, for pedagogical purposes it is assumed herein that pixels are supplied for processing by the process of FIG. 4 grouped by block, so all the pixels of a block are processed prior to any pixels of the next block being processed. However, in designing an actual system, those of ordinary skill in the art will readily recognize that the pixels may be processed in the same order that they are scanned and that appropriate memory locations and control structures may be used so as to effectively separately process the blocks. However, the subscripts necessary to represent doing so would increase the complexity of FIG. 4 and thereby reduce its clarity.

After entering the process in step 401, control passes to conditional branch point 402, which tests to determine if the new pixel to be processed belongs to a new block, i.e., a block that is different from the block to which the previously processed pixel belongs. If the test result in step 402 is YES, indicating that the current pixel belongs to a different from the block to which the previously processed pixel belongs, control passes to step 403 in which a variable SD is set to zero. SD represents the so-called soft-data for the block, which is some information used as an approximation upon which a determination will actually be made as to whether or not the actual data received is a zero or a one. After executing step 403, or if the test result in step 402 is NO, indicating that the current pixel belongs to the same block as the previous pixel, control passes to step 404.

In step 404, an RGB representation of the pixel being processed is developed, e.g., by matrix conversion unit 205 (FIG. 2). Thereafter, conditional branch point 405 (FIG. 4), tests to determine on which chrominance portion it is most likely that the additional information that was encoded, i.e., was the additional information encoded on the U chrominance portion or the V chrominance portion. This test may be carried out by color selection unit 207 (FIG. 2). One way of performing this test is to compute the value of a human visual system (HVS) function which we have developed as follows using the values of the pixels with the information impressed upon them.

$$HVS(Y,U,V,R,G,B)=\{[((G<90)\wedge (G<R))\vee (U<V)]\vee ((R<G)\wedge (B<G))\}\wedge \sim((G<0.5B)\wedge (R<0.50B)),$$

where ∧ means logical AND operator, ∨ means the logical OR operator, and ~ means logical inverse operator. The < operator, the less than operator, evaluates to a 1 when the expression is met and to a 0 depending when the expression is not met. This HVS formula has been empirically derived by trial and error by adding data to a fixed video clip and determining which combinations yield the least distortion perceivable by the eye, especially flicker. Other acceptable formulas may be developed by those of ordinary skill in the art. If the value of HVS(Y,U,V,R,G,B) is 1, then the result is considered to be U. If the value of HVS(Y,U,V,R,G,B) is 0, then the result is considered to be V.

Note that it is possible that HVS will determine the wrong chrominance portion. However, such a likelihood is very small, and furthermore, such an erroneous result is also likely to be canceled out by the time the final hard value of the data that was impressed is determined due to the subsequent steps of the process.

If the test result in step 405 is U, indicating that the data that was encoded was most likely encoded on the U chrominance portion, control passes to conditional branch point 407, which tests to determine whether the color variance for the U chrominance portion is greater than a first prescribed threshold th1 which is the largest threshold. In one embodiment of the invention, the color variance is evaluated by looking at the difference in color values between the pixel being processed and its neighboring pixels, e.g., its immediately adjacent neighbors, and taking an average of the differences. Note that in the exemplary embodiment herein the color variance is computed using the values of the pixels with the information impressed upon them, although those of ordinary skill in the art may develop other embodiments. Thus, the U and V as seen by the receiver in the exemplary embodiment of FIG. 4 need not be the same as the U and V seen by the transmitter, e.g., used in the exemplary embodiment of FIG. 3. Mathematically, such a color variance may be expressed by $$TXT(U(m,n)) = \sum_{i=-1}^{1} \sum_{j=-1}^{1} [U(m,n) - U(m-i, n-j)]^2$$

where m is the index of the row of the frame and n is the index of the column of the frame, i is the offset values used to point to the eight adjacent pixels of pixel (m, n).

If the test result in step 407 is YES, indicating that the color variance is large enough that the data was likely to have been encoded with the maximum encoded value, represented as L1, e.g., 5, control is passed to conditional branch point 409 which tests to determine if the absolute value of $(U-U_p)/L1$ is less than TH, a predetermined threshold, where U is the value of the U chrominance portion for the current pixel and $U_p$ is the value of the U chrominance portion for the same pixel position as is the current pixel but in a preceding, e.g., the immediately preceding, frame. The value of threshold TH is set by the implementer, typically as a function of the values of the L values. For L1-L5 having values from 1-5, respectively, as described hereinabove in connection with FIG. 3, it has been determined experimentally that a value for FH of 2.5 is useful. The value of TH may be changed by the implementer to affect the overall system bit error rate, and a value differing from 2.5 may be selected based on the implementer's system having different interleaving and channel coding schemes, as well as any other different parameters. It may further be affected if differential encoding of the information to be impressed is not employed in the transmitter.

If the test result in step 409 is YES, indicating that the absolute value of $(U-U_p)/L1$ is less than TH, control passes to step 447, in which SD is set equal to the previous value of SD plus $(U-U_p)/L1$, which is the normalized value of the differential data, because the information that was impressed by the transmitter is differentially encoded with respect to the same pixel position of the prior frame, and the data is normalized by having been divided by the value of L1. Control then passes to conditional branch point 410, which tests to determine if the pixel just processed is the last pixel of a block. If the test result in step 410 is YES, indicating the pixel just processed is the last pixel of a block, control passes to step 411, in which the absolute value of SD is supplied as an output, e.g., to block deinterleaver 219 (FIG. 2). This is the output of the process and will be used by channel decoder 221 to determine whether a one or a zero was received. Control then passes to step 499 (FIG. 4) and the process is exited for this pixel. If the test result in step 410 is NO, indicating the pixel just processed is not the last pixel of a block, control passes directly to step 499, and the process is exited for this pixel.

If the test result in step 409 is NO, indicating that the absolute value of $(U-U_p)/L1$ is greater than TH, indicating a large difference in value between the U value of the current pixel and the U value of the like-positioned pixel of the previous frame, control passes to step 445, in which SD is set equal to the previous value of SD plus the value of $|U-U_p|/(U-U_p)*K$, where K is a constant independent of U or $U_p$). K represents a saturation value, and typically is a positive value, e.g., 1. Thus, K is the value that is added when the difference between the U value of the current pixel and the U value of the like-positioned pixel of the previous frame is very high, which is likely to be the result of differences in the frames of the pixels, e.g., due to scene changes or a change of the object at the location of the current pixel from that of the previous pixel, rather than the result of the impression of information on the U chrominance portion. Control then passes to step 410 and the process continues as described above.

If the test result in step 407 is NO, indicating that the color variance for the U chrominance portion is not greater than the first prescribed threshold th1, which is the largest threshold, control passes to conditional branch point 413, which tests to determine it the color variance for the U chrominance portion is greater than a second prescribed threshold th2, which is the second largest threshold. If the test result in step 413 is YES, indicating that the color variance is large enough that the data was likely to have been encoded with the second largest encoded value, represented as L2, e.g., 4, control is passed to step 415, which tests to determine if the absolute value of $(U-U_p)/L2$ is less than TH. If the test result in step 409 is YES, indicating that the absolute value of $(U-U_p)/L2$ is less than TH, control passes to step 449, in which SD is set equal to the previous value of SD plus $(U-U_p)/L2$, which is the value of the differential data normalized by L2. Control then passes to step 410 and the process continues as described above.

If the test result in step 415 is NO, indicating that the absolute value of $(U-U_p)/L2$ is greater than TH, indicating a large difference in value between the U value of the current pixel and the U value of the like-positioned pixel of the previous flame, control passes to step 445, in which SD is set equal to the previous value of SD plus the value of $|U-U_p|/(U-U_p)*K$, as described above. Control then passes to step 410 and the process continues as described above.

If the test result in step 413 is NO, indicating that the color variance for the U chrominance portion is not greater than the second prescribed threshold th2, control passes to conditional branch point 417, which tests to determine if the color variance for the U chrominance portion is greater than a third prescribed threshold th3, which is the second smallest threshold. If the test result in step 417 is YES, indicating that the color variance is large enough that the data may be encoded with the middle encoded value, represented as L3, e.g., 3, control is passed to step 419, which tests to determine if the absolute value of $(U-U_p)/L3$ is less than TH. If the test result in step 419 is YES, indicating that the absolute value of $(U-U_p)/L3$ is less than TH, control passes to step 451, in which SD is set equal to the previous value of SD plus $(U-U_p)/L3$, which is the value of the differential data normalized by L3. Control then passes to step 410 and the process continues as described above.

If the test result in step 419 is NO, indicating that the absolute value of $(U-U_p)/L3$ is greater than TH, indicating a large difference in value between the U value of the current pixel and the U value of the like-positioned pixel of the previous frame, control passes to step 445, in which SD is set equal to the previous value of SD plus the value of $|U-U_p|/(U-U_p)*K$, as described above. Control then passes to step 410 and the process continues as described above.

If the test result in step 417 is NO, indicating that the color variance for the U chrominance portion is not greater than the third prescribed threshold th3, control passes to conditional branch point 421, which tests to determine it the color variance for the U chrominance portion is greater than a fourth prescribed threshold th4, which is the smallest threshold. If the test result in step 421 is YES, indicating that the color variance is large enough that the data that the data may be encoded with the second smallest encoded value, represented as L4, e.g., 2, control is passed to step 423 which tests to determine if the absolute value of $(U-U_p)/L4$ is less than TH. If the test result in step 423 is YES, indicating that the absolute value of $(U-U_p)/L4$ is less than TH, control passes to step 453, in which SD is set equal to the previous value of SD plus $(U-U_p)/L4$, which is the value of the differential data normalized by L4. Control then passes to step 410 and the process continues as described above.

If the test result in step 423 is NO, indicating that the absolute value of $(U-U_p)/L4$ is greater than TH, indicating a large difference in value between the U value of the current pixel and the U value of the like-positioned pixel of the previous frame, control passes to step 445, in which SD is set equal to the previous value of SD plus the value of $|U-U_p|/(U-U_p)*K$, as described above. Control then passes to step 410 and the process continues as described above.

If the test result in step 421 is NO, indicating that the color variance is only large enough that the data may have been encoded with the smallest encoded value, represented as L5, e.g., 1, control is passed to step 455, which tests to determine if the absolute value of $(U-U_p)/L5$ is less than TH. If the test result in step 455 is YES, indicating that the absolute value of $(U-U_p)/L5$ is less than TH, control passes to step 457, in which SD is set equal to the previous value of SD plus $(U-U_p)/L5$, which is the value of the differential data normalized by L5. Control then passes to step 410 and the process continues as described above.

If the test result in step 455 is NO, indicating that the absolute value of $(U-U_p)/L5$ is greater than TH, indicating a large difference in value between the U value of the current pixel and the U value of the like-positioned pixel of the previous frame, control passes to step 445, in which SD is set equal to the previous value of SD plus the value of $|U-U_p|/(U-U_p)*K$, as described above. Control then passes to step 410 and the process continues as described above.

If the test result in step 405 is V, indicating that the data that was encoded was most likely encoded on the V chrominance portion, control passes to conditional branch point 427, which tests to determine whether the color variance for the V chrominance portion is greater than a first prescribed threshold th1, which is the largest threshold. In one embodiment of the invention, the color variance is evaluated by looking at the difference in color values between the pixel being processed and its neighboring pixels, e.g., its immediately adjacent neighbors, and taking an average of the differences. Note that in the exemplary embodiment herein the color variance is computed using the values of the pixels with the information impressed upon them, although those of ordinary skill in the art may develop other embodiments. Thus, the U and V as seen by the receiver in the exemplary embodiment of FIG. 4 need not be the same as the U and V seen by the transmitter, e.g., used in the exemplary embodiment of FIG. 3. Mathematically, such a color variance may be expressed by $$TXT(V(m,n)) = \sum_{i=-1}^{1} \sum_{j=-1}^{1} [V(m,n) - V(m-i, n-j)]^2$$

where m is the index of the row of the frame and n is the index of the column of the frame, i is the offset values used to point to the eight adjacent pixels of pixel (m,n).

If the test result in step 427 is YES, indicating that the color variance is large enough that the data was likely to have been encoded with the maximum encoded value, represented as L1, e.g., 5, control is passed to conditional branch point 429 which tests to determine if the absolute value of $(V-V_p)/L1$ is less than TH, a predetermined threshold, where V is the value of the V chrominance portion for the current pixel and $V_p$ is the value of the V chrominance portion for the same pixel position as is the current pixel but in a preceding, e.g., the immediately preceding, frame. The value of threshold TH is set by the implementer, typically as a function of the values of the L values. For L1-L5 having values from 1-5, respectively, as described hereinabove in connection with FIG. 3, it has been determined experimentally that a value for TH of 2.5 is useful. The value of TH may be changed by the implementer to affect the overall system bit error rate, and a value differing from 2.5 may be selected based on the implementer's system having different interleaving and channel coding schemes, as well as any other different parameters. It may further be affected if differential encoding of the information to be impressed is not employed in the transmitter.

If the test result in step 429 is YES, indicating that the absolute value of $(V-V_p)/L1$ is less than TH, control passes to step 461, in which SD is set equal to the previous value of SD plus $(V-V_p)/L1$, which is the normalized value of the differential data, because the information that was impressed by the transmitter is differentially encoded with respect to the same pixel position of the prior frame, and the data is normalized by having been divided by the value of L1. Control then passes to step 410 and the process continues as described above.

If the test result in step 429 is NO, indicating that the absolute value of $(V-V_p)/L1$ is greater than TH, indicating a large difference in value between the V value of the current pixel and the V value of the like-positioned pixel of the previous frame, control passes to step 459, in which SD is set equal to the previous value of SD plus the value of $|V-V_p|/(V-V_p)*K$, where K is a constant independent of V or $V_p$. K represents a saturation value, and typically is a positive value, e.g., 1. Thus, K is the value that is added when the difference between the V value of the current pixel and the V value of the like-positioned pixel of the previous frame is very high, which is likely to be the result of differences in the frames of the pixels, e.g., due to scene changes or a change of the object at the location of the current pixel from that of the previous pixel, rather than the result of the impression of information on the V chrominance portion. Control then passes to step 410 and the process continues as described above.

If the test result in step 427 is NO, indicating that the color variance for the V chrominance portion is not greater than the first prescribed threshold th1, which is the largest threshold, control passes to conditional branch point 431, which tests to determine if the color variance for the V chrominance portion is greater than a second prescribed threshold th2, which is the second largest threshold. If the test result in step 431 is YES, indicating that the color variance is large enough that the data was likely to have been encoded with the second largest encoded value, represented as L2, e.g., 4, control is passed to step 433, which tests to determine if the absolute value of $(V-V_p)/L2$ is less than TH. If the test result in step 429 is YES, indicating that the absolute value of $(V-V_p)/L2$ is less than TH, control passes to step 463, in which SD is set equal to the previous value of SD plus $(V-V_p)/L2$, which is the value of the differential data normalized by L2. Control then passes to step 410 and the process continues as described above.

If the test result in step 433 is NO, indicating that the absolute value of $(V-V_p)/L2$ is greater than TH, indicating a large difference in value between the V value of the current pixel and the V value of the like-positioned pixel of the previous frame, control passes to step 459, in which SD is set equal to the previous value of SD plus the value of $|V-V_p|/(V-V_p)*K$, as described above. Control then passes to step 410 and the process continues as described above.

If the test result in step 431 is NO, indicating that the color variance for the V chrominance portion is not greater than the second prescribed threshold th2, control passes to conditional branch point 435, which tests to determine if the color variance for the V chrominance portion is greater than a third prescribed threshold th3, which is the second smallest threshold. If the test result in step 435 is YES, indicating that the color variance is large enough that the data that the data may be encoded with the middle encoded value, represented as L3, e.g., 3, control is passed to step 437, which tests to determine it the absolute value of $(V-V_p)/L3$ is less than TH. If the test result in step 437 is YES, indicating that the absolute value of $(V-V_p)/L3$ is less than TH, control passes to step 465, in which SD is set equal to the previous value of SD plus $(V-V_p)/L3$, which is the value of the differential data normalized by L3. Control then passes to step 410 and the process continues as described above.

If the test result in step 437 is NO, indicating that the absolute value of $(V-V_p)/L3$ is greater than TH, indicating a large difference in value between the V value of the current pixel and the V value of the like-positioned pixel of the previous frame, control passes to step 459, in which SD is set equal to the previous value of SD plus the value of $|V-V_p|/(V-V_p)*K$, as described above. Control then passes to step 410 and the process continues as described above.

If the test result in step 435 is NO, indicating that the color variance for the V chrominance portion is not greater than the third prescribed threshold th3, control passes to conditional branch point 439, which tests to determine if the color variance for the V chrominance portion is greater than a fourth prescribed threshold th4, which is the smallest threshold. If the test result in step 439 is YES, indicating that the color variance is large enough that the data that the data may be encoded with the second smallest encoded value, represented as L4, e.g., 2, control is passed to step 441, which tests to determine if the absolute value of $(V-V_p)/L4$ is less than TH. If the test result in step 441 is YES, indicating that the absolute value of $(V-V_p)/L4$ is less than TH, control passes to step 467, in which SD is set equal to the previous value of SD plus $(V-V_p)/L4$, which is the value of the differential data normalized by L4. Control then passes to step 410 and the process continues as described above.

If the test result in step 441 is NO, indicating that the absolute value of $(V-V_p)/L4$ is greater than TH, indicating a large difference in value between the V value of the current pixel and the V value of the like-positioned pixel of the previous flame, control passes to step 459, in which SD is set equal to the previous value of SD plus the value of $|V-V_p|/(V-V_p)*K$, as described above. Control then passes to step 410 and the process continues as described above.

If the test result in step 439 is NO, indicating that the color variance is only large enough that the data may have been encoded with the smallest encoded value, represented as L5, e.g., 1, control is passed to step 469, which tests to determine if the absolute value of $(V-V_p)/L5$ is less than TH. If the test result in step 469 is YES, indicating that the absolute value of $(V-V_p)/L5$ is less than TH, control passes to step 471, in which SD is set equal to the previous value of SD plus (V−V$_p$)/L5, which is the value of the differential data normalized by L5. Control then passes to step 410 and the process continues as described above.

If the test result in step 469 is NO, indicating that the absolute value of (V−V$_p$)/L5 is greater than TH, indicating a large difference in value between the V value of the current pixel and the V value of the like-positioned pixel of the previous frame, control passes to step 459, in which SD is set equal to the previous value of SD plus the value of |V−V$_p$|/(V−V$_p$)*K, as described above. Control then passes to step 410 and the process continues as described above.

Note that although the use of 4 thresholds and 5 encoded values has been shown in FIG. 4, those of ordinary skill in the art will readily be able to adapt the indicated method to other numbers of thresholds and encoded values.

In order to help keep the data from being detectable by the human visual system, in one embodiment of the invention, the information to be transmitted, which is the original data after channel encoding and block interleaving, is encoded differentially with respect to the information that was transmitted in the like-positioned block of the previous frame. Thus, the information is based on the detected transitions and the value determined to have been previously transmitted. Thus, there is a two step process. First there is a determination as to the value to actually be impressed on a block based on the value of the information to be impressed. This may be performed by bit mapper 123 as suggested above. Second, the value to actually be impressed is impressed using the process of FIG. 3, e.g., by texture masking unit 111 (FIG. 1).

To this end, every block of the first frame transmitted, which is a reference frame, has no additional information impressed on it. Note that such a lack of information may be achieved either by either adding uniformly nothing or a value representing a logic one based on the texture values. Thereafter, i.e., for the next frame after the reference frame, the value of the information to be transmitted for a block is obtained. If the value is a one, the value opposite to that of the like-positioned block of the reference frame is transmitted. If the value is a zero, the same value as was added to the like-positioned block of the reference frame is transmitted, e.g., both are zero. Thereafter, the determined value to be impressed is supplied to multiplier 113. If a zero is to be transmitted, then nothing is added to the block which is carrying the data. If a one is to be transmitted, the one is encoded by texture masking unit 111, e.g., using the process of FIG. 3.

In a receiver, e.g., as shown in FIG. 2, the data supplied as an output from scaling unit 217, e.g., the output of the process of FIG. 4, provided there are no errors, is the data as it was submitted bit mapper 123, because the process of FIG. 4 takes into account the values of like-positioned pixels of the previous frame, as described above.

Note that those of ordinary skill in the art will readily be able to develop embodiments of the invention in which although more than one pixel per block is impressed with additional information, not all pixels of a block are so impressed. Similarly, not all blocks of each frame or field of the video signal need be impressed with additional information.

What is claimed is:

1. A method for use in connection with a video signal having at least two frames, the method comprising the step of inserting additional information within said video signal by incorporating said additional information only within the chrominance component of said video signal and wherein the luminance component of each pixel of said video signal is not permitted to be modified to carry any additional information at all for the entirety of said video signal by said method.

2. The invention as defined in claim 1 wherein said additional information is incorporated on only one portion of the chrominance component of said video signal for each pixel carrying said additional information.

3. The invention as defined in claim 2 wherein said one portion of the chrominance component of said video signal for each pixel is selected as a function of the amount of distortion that can be introduced on said pixel and yet remain substantially undetected by the human visual system.

4. Apparatus, comprising:
means for receiving a video signal having at least two frames; and
means for inserting additional information within said video signal by adding said additional information only to the chrominance component of said video signal wherein said means for inserting is incapable of modifying the luminance component of any pixel of said video signal to include any additional information.

5. The invention as defined in claim 4 wherein said means for inserting further comprises:
means for determining which portion of said chrominance component will carry said additional information for each pixel for each pixel to carry said additional information.

6. The invention as defined in claim 4 wherein said means for inserting further comprises:
means for determining a magnitude to represent said additional information to be inserted for each pixel to carry said additional information.

7. The invention as defined in claim 4 wherein said means for inserting further comprises:
means for combining for each pixel to carry said additional information (i) a modified first chrominance portion to which said additional information has been added (ii) an unmodified second chrominance portion, and (iii) an unmodified luminance signal to produce said video signal with inserted additional information.

8. The invention as defined in claim 4 wherein said means for inserting further comprises:
means for determining the bit of said additional information to be added to each pixel to carry said additional information.

9. Apparatus for use in connection with a video signal, said apparatus comprising:
means for receiving a video signal having at least two frames and containing additional information embedded only within the chrominance signal of said video signal, said video signal having been produced by modifying an original video signal by a process which was not permitted to modify the luminance component of any pixel of said original video signal to include any additional information in producing said video signal; and
means for extracting said additional information from said video signal.

10. A method for use in connection with a video signal having at least two frames, the method comprising the step of recovering additional information from within said video signal from only the chrominance component of said video signal, said video signal having been produced by modifying an original video signal using a process that was incapable of modifying the luminance component of any pixel of said original video signal to include any additional information when producing said video signal.

11. A method for use in connection with a video signal comprising the step of recovering additional information that was embedded only within the chrominance component of said video signal, the luminance component of each pixel of said video signal having been barred from containing such additional information.

12. Software embodied in a non-transitory computer-readable medium comprising instructions for causing a processor processing a video signal having at least two frames
to insert additional information within said video signal by embedding said additional information only on the chrominance component of said video signal while never permitting the luminance component of any pixel of said video signal to be modified to carry additional information.

13. Apparatus for use in connection with a video signal having least two frames, said apparatus comprising a video signal modifier which modifies only the chrominance of said video signal to include additional information therein and is adapted to keep the luminance component of each pixel of said video signal from including any additional information.

14. Apparatus for recovering additional information embedded on ones of pixels of a video signal, said video signal having at least two frames and having been produced in a manner which barred additional information from being embedded on its luminance portion, said apparatus comprising:
a color selection unit that selects which of the U portion or V portion of the chrominance component of each of said pixels of said video signal is likely carrying said additional information; and
a texture masking unit that determines the likely value embedded on each of said pixels based on the amount of distortion can be tolerated on the selected portion of the chrominance component for each of said pixels.

15. The invention as defined in claim 14 further comprising a frame store for storing a previous frame.

16. The invention as defined in claim 15 further comprising a subtractor for subtracting, from the value of the portion of said chrominance component selected by said color selection unit for a pixel for the current frame, the value of the same chrominance component of the like-positioned pixel in said stored previous frame.

17. The invention as defined in claim 15 further comprising a YUV to RGB converter.

18. Apparatus for embedding additional information on ones of pixels of a video signal having at least two frames, said apparatus comprising:
a color selection unit that selects which of the U portion or V portion of the chrominance component of each of said pixels of said video signal is to carry said additional information; and
a texture masking unit that determines the amount of distortion can be tolerated on the selected portion of the chrominance component for each of said pixels;
wherein said apparatus is incapable of including any additional information on the luminance portion of any pixel of said video signal.

19. The invention as defined in claim 18 further comprising an adder for adding to the original chrominance portion selected by said color selection unit for each of said pixels a value representative of the additional information to be added for the pixel to produce a modified chrominance portion, said value being such so as to introduce no more than the amount of distortion determined by said texture masking unit can be tolerated on the selected portion of the chrominance component for the pixel.

20. The invention as defined in claim 19 further comprising a video reconstructor which combines said modified chrominance portion for the pixel, the chrominance portion not selected by said color selection unit for the pixel, and the corresponding luminance signal for the pixel to produce each of said pixels with embedded additional information.

* * * * *